United States Patent
Niederdraenk et al.

(10) Patent No.: US 10,427,492 B2
(45) Date of Patent: *Oct. 1, 2019

(54) VEHICLE HAVING AN INTERNAL COMBUSTION ENGINE AND A WASTE-HEAT COLLECTING HOUSING

(71) Applicant: Bayerische Motoren Werke Aktiengesellschaft, Munich (DE)

(72) Inventors: Franziska Niederdraenk, Munich (DE); Juergen Von Wild, Munich (DE); Carsten Spengler, Munich (DE); Ivo Weese, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 302 days.

This patent is subject to a terminal disclaimer.

(21) Appl. No.: 15/232,846

(22) Filed: Aug. 10, 2016

(65) Prior Publication Data

US 2017/0036510 A1 Feb. 9, 2017

Related U.S. Application Data

(63) Continuation of application No. PCT/EP2015/060012, filed on May 7, 2015.

(30) Foreign Application Priority Data

May 16, 2014 (DE) .................. 10 2014 209 275

(51) Int. Cl.
*B60H 1/00* (2006.01)
*B60H 1/18* (2006.01)
(Continued)

(52) U.S. Cl.
CPC .......... *B60H 1/00492* (2013.01); *B60H 1/18* (2013.01); *B60H 1/20* (2013.01); *F01N 5/02* (2013.01); *F01N 13/10* (2013.01); *Y02T 10/16* (2013.01)

(58) Field of Classification Search
CPC .......... B60H 1/20; F01M 5/001; F01N 13/10; F01N 2260/022; F01N 5/02; Y02T 10/16
See application file for complete search history.

(56) References Cited

U.S. PATENT DOCUMENTS

| 1,428,299 A | 9/1922 | Rogers |
| 4,415,118 A | 11/1983 | Endo |
(Continued)

FOREIGN PATENT DOCUMENTS

| CH | 283289 A | 5/1952 |
| CN | 202169857 U | 3/2012 |
(Continued)

OTHER PUBLICATIONS

International Search Report (PCT/ISA/210) issued in PCT Application No. PCT/EP2015/060012 dated Aug. 19, 2015 with English translation (six pages).

(Continued)

*Primary Examiner* — Audrey K Bradley
*Assistant Examiner* — Anthony Ayala Delgado
(74) *Attorney, Agent, or Firm* — Crowell & Moring LLP

(57) ABSTRACT

A waste-heat collection system for a vehicle is provided. The vehicle includes an internal combustion engine and an exhaust manifold via which exhaust manifold hot exhaust gas coming from the internal combustion engine is introduced into an engine-side segment of an exhaust system. The exhaust manifold and/or the engine-side segment of the exhaust system, an exhaust gas turbocharger and/or a catalytic converter are at least partially surrounded by a waste- (Continued)

heat collecting housing. Air contained in the waste-heat collecting housing is heated by waste heat of these components and the heated air is used to charge a latent heat accumulator.

16 Claims, 3 Drawing Sheets

(51) Int. Cl.
    *F01N 5/02* (2006.01)
    *F01N 13/10* (2010.01)
    *B60H 1/20* (2006.01)

(56) References Cited

U.S. PATENT DOCUMENTS

| | | | | |
|---|---|---|---|---|
| 4,623,092 | A | * 11/1986 | Arndt | B60H 1/025 237/12.3 A |
| 4,982,895 | A | * 1/1991 | Shimizu | B60H 1/00314 237/12.3 A |
| 6,341,814 | B1 | 1/2002 | Hoenninger et al. | |
| 2012/0001111 | A1* | 1/2012 | Takeda | F02B 37/186 251/231 |
| 2016/0250908 | A1* | 9/2016 | Nakashima | B60H 1/025 165/51 |

FOREIGN PATENT DOCUMENTS

| | | | | |
|---|---|---|---|---|
| DE | 1092788 | B | * 11/1960 | ............... B60H 1/20 |
| DE | 1 580 713 | A | 12/1969 | |
| DE | 2 207 092 | A | 8/1973 | |
| DE | 32 45 027 | A1 | 6/1984 | |
| DE | 44 41 351 | A1 | 5/1996 | |
| DE | 199 08 497 | A1 | 9/2000 | |
| DE | 20 2005 015 496 | U1 | 12/2005 | |
| DE | 10 2011 018 382 | A1 | 10/2012 | |
| EP | 1 162 094 | A1 | 12/2001 | |
| EP | 435173 | A | 12/2001 | |
| EP | 1162094 | A1 * | 12/2001 | ............... B60H 1/18 |
| FR | 2719810 | A1 * | 11/1995 | ............. B60H 1/025 |

OTHER PUBLICATIONS

German-language Written Opinion (PCT/ISA/237) issued in PCT Application No. PCT/EP2015/060012 dated Aug. 19, 2015 (five pages).

German Office Action issued in counterpart German Application No. 10 2014 209 275.2 dated Apr. 9, 2015 (six pages).

Chinese-language Office Action issued in counterpart Chinese Application No. 201580010097.7 dated Jan. 9, 2018 with English translation (Five (5) pages).

Chinese-language Office Action issued in counterpart Chinese Application No. 201580010097.7 dated May 22, 2017 with English translation (18 pages).

* cited by examiner

VEHICLE HAVING AN INTERNAL COMBUSTION ENGINE AND A WASTE-HEAT COLLECTING HOUSING

CROSS REFERENCE TO RELATED APPLICATIONS

This application is a continuation of PCT International Application No. PCT/EP2015/060012, filed May 7, 2015, which claims priority under 35 U.S.C. § 119 from German Patent Application No. 10 2014 209 275.2, filed May 16, 2014, the entire disclosures of which are herein expressly incorporated by reference.

BACKGROUND AND SUMMARY OF THE INVENTION

The present invention relates to a vehicle having an internal combustion engine and a waste-heat collecting housing.

German patent document DE 4441351 A1 discloses a vehicle having a latent heat accumulator in which, when the vehicle is parked, heat can be stored, said heat permitting more rapid heating up of the passenger compartment following a cold start of the vehicle. The latent heat accumulator is connected to the cooling circuit of an internal combustion engine of the vehicle and can accordingly be "charged" with heat from the cooling circuit of the internal combustion engine. If the internal combustion engine is "cold", heat can be output from the heat accumulator into the cooling water, and therefore the internal combustion engine more rapidly reaches its normal operating temperature. Following a "cold start" of the vehicle, the passenger compartment can also be heated up comparatively rapidly by the heat stored in the heat accumulator, i.e., without the internal combustion engine already having to have reached its full operating temperature.

It is an object of the invention to provide a vehicle in which heat output by the internal combustion engine in another manner (i.e., not via the cooling circuit) can be used, in particular for storing in a heat accumulator.

The starting point of the invention is a vehicle having an internal combustion engine and an exhaust manifold via which hot exhaust gas coming from the internal combustion engine is introduced in an engine-side portion of an exhaust system. The term "engine-side portion" of the exhaust system comprises in particular the portion between the exhaust manifold and a portion of the exhaust system that adjoins the engine-side portion and runs in the underbody region of the vehicle.

An essential concept of the invention consists in that, by use of a waste-heat collecting housing which surrounds or encloses at least part of the exhaust manifold and/or part of an engine-side portion of the exhaust system, the air contained in the exhaust gas collecting housing is heated. The transfer of heat from the exhaust manifold and/or the engine-side portion of the exhaust system to the air contained in the waste-heat collecting housing takes place via heat radiation and convection.

The heated air can be used indirectly, for example via a heat accumulator, or else directly, for heating air which is introduced into a passenger compartment of the vehicle.

For thermal reasons, it can be provided that the waste-heat collecting housing is at least partially, in particular largely, composed of metal sheet. As an alternative thereto, the waste-heat collecting housing can also be produced from a sufficiently thermally stable plastics material.

As already explained, the waste-heat collecting housing surrounds at least part of the exhaust manifold or the entire exhaust manifold and/or at least part of an engine-side portion of the exhaust system. In particular, it can be provided that at least one catalytic converter of the exhaust system is arranged within the waste-heat collecting housing. The catalytic converter can be, for example, an NOx storage catalytic converter, an SCR catalytic converter (catalytic converter for carrying out selective catalytic reduction) or the like.

Alternatively or additionally thereto, it can be provided that an exhaust gas turbocharger or at least one turbine-side region of the exhaust gas turbocharger is arranged within the waste-heat collecting housing.

According to a development of the invention, the waste-heat collecting housing has an air inlet via which air can flow from the surroundings or from an engine compartment of the vehicle into the waste-heat collecting housing. After the operating temperature of the internal combustion engine is reached, the air located in the engine compartment is warmer than the ambient air and, after flowing into the waste-heat collecting housing, is heated further by the from the exhaust manifold and/or the engine-side portion of the exhaust system.

According to a development of the invention, the waste-heat collecting housing has at least one first air outlet for heated air. It can be provided that the first air outlet is thermally connected via an air duct to a heat accumulator, wherein the heated air coming from the waste-heat collecting housing outputs heat to the heat accumulator.

The term "heat accumulator" is understood as meaning a device which is provided and is suitable for storing heat for a prolonged period, in particular for a period of more than one day. The heat accumulator contains a heat transfer agent or a heat transfer medium which is accommodated in a housing of the heat accumulator. The housing is thermally insulated toward the outside, as a result of which heat losses into the environment are minimized.

The heat transfer agent can contain in particular a "phase change medium," i.e., a medium which makes a phase transfer between the states of "heat accumulator charged" and "heat accumulator discharged." Heat accumulators of this type are also referred to as "latent heat accumulators." They can be used to store heat in a vehicle parked for a prolonged period, said heat then being available just a few seconds following a cold start of the vehicle in order to heat the passenger compartment and/or in order to preheat the internal combustion engine of the vehicle.

In comparison to conventional vehicles having a heat accumulator, in which the heat accumulator is coupled thermally to a cooling circuit of the internal combustion engine, the arrangement according to the invention is substantially more simple and more cost-effective.

According to a development of the invention, the exhaust gas collecting housing has at least one second air outlet via which air heated in the exhaust gas collecting housing can be directly removed, bypassing the first air outlet and the heat accumulator, to the environment. If the heat accumulator is "Charged up" to a maximum or approximately to a maximum with heat, it may be expedient to remove the air heated in the exhaust gas collecting housing directly to the environment.

Furthermore, a fan can be provided which, in the exhaust gas collecting housing, produces an air flow directed toward the first and/or the second air outlet. In other words, by use of a fan of this type, air can be sucked in via the air inlet of the waste-heat collecting housing or air can be blown in via the air inlet. As already indicated, the air can be sucked or blown into the waste-heat collecting housing from the environment or from the engine compartment of the vehicle.

The fan can be arranged within the waste-heat collecting housing. As an alternative thereto, it can also be arranged in the region of the air inlet.

According to a development of the invention, an exhaust air duct is provided via which cooled air coming from the heat accumulator can be removed to the environment.

According to a development of the invention, a first heat exchanger is provided via which heat can be transferred from the heat accumulator to the air to be introduced into a passenger compartment of the vehicle. If the heat accumulator is filled with a liquid heat transfer medium, the first heat exchanger can be a liquid/air heat exchanger. If the heat accumulator is filled with a gaseous medium, the heat exchanger can be a gas/air heat exchanger. The first heat exchanger can be accommodated together with the heat accumulator in a common housing.

Alternatively or additionally thereto, a second heat exchanger (air/air heat exchanger) can be provided via which heat from the air heated in the waste-heat collecting housing can be directly transferred to the air to be introduced into the passenger compartment of the vehicle, with the heat accumulator being bypassed.

Furthermore, a valve or flap arrangement which can be controlled by an actuator system can be provided, wherein, depending on the position of the valve or flap arrangement,
- the entire air flow coming from the waste-heat collecting housing is conducted via the first air outlet and the heat accumulator into the environment (wherein heat is stored in the heat accumulator) or
- the entire air flow coming from the waste-heat collecting housing is conducted, bypassing the first air outlet and the heat accumulator, directly into the environment, or
- a first partial volumetric flow of the air flow coming from the waste-heat collecting housing is conducted into the environment via the first air outlet and the heat accumulator (wherein heat is stored in the heat accumulator), and a second partial volumetric flow of the air flow coming from the waste-heat collecting housing is conducted into the environment, bypassing the first air outlet and the heat accumulator.

Conducting all of the air flow coming from the waste-heat collecting housing into the environment via the first air outlet and the heat accumulator is expedient if the heat accumulator is completely or substantially discharged or if it is not yet completely charged. Conducting all of the air flow coming from the waste-heat collecting housing directly into the environment, with the heat accumulator being bypassed is expedient if the heat accumulator is virtually or completely "charged".

The above-described "mixed mode" (third dash in the list) may be expedient if the heat accumulator is already partially charged.

According to a development of the invention, the actuator system has an electric actuator, for example in the form of a stepping motor or the like.

It can be provided that the valve or flap arrangement has an unactuated basic position in which the entire air flow coming from the waste-heat collecting housing is conducted, bypassing the heat accumulator, into the environment. The valve or flap arrangement can be prestressed into the unactuated basic position, for example by a spring arrangement. It is thereby ensured that, in the event of a malfunction or a failure of the actuator system, the valve or flap device merges into the unactuated basic position. Overheating of the heat accumulator is thereby reliably prevented.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
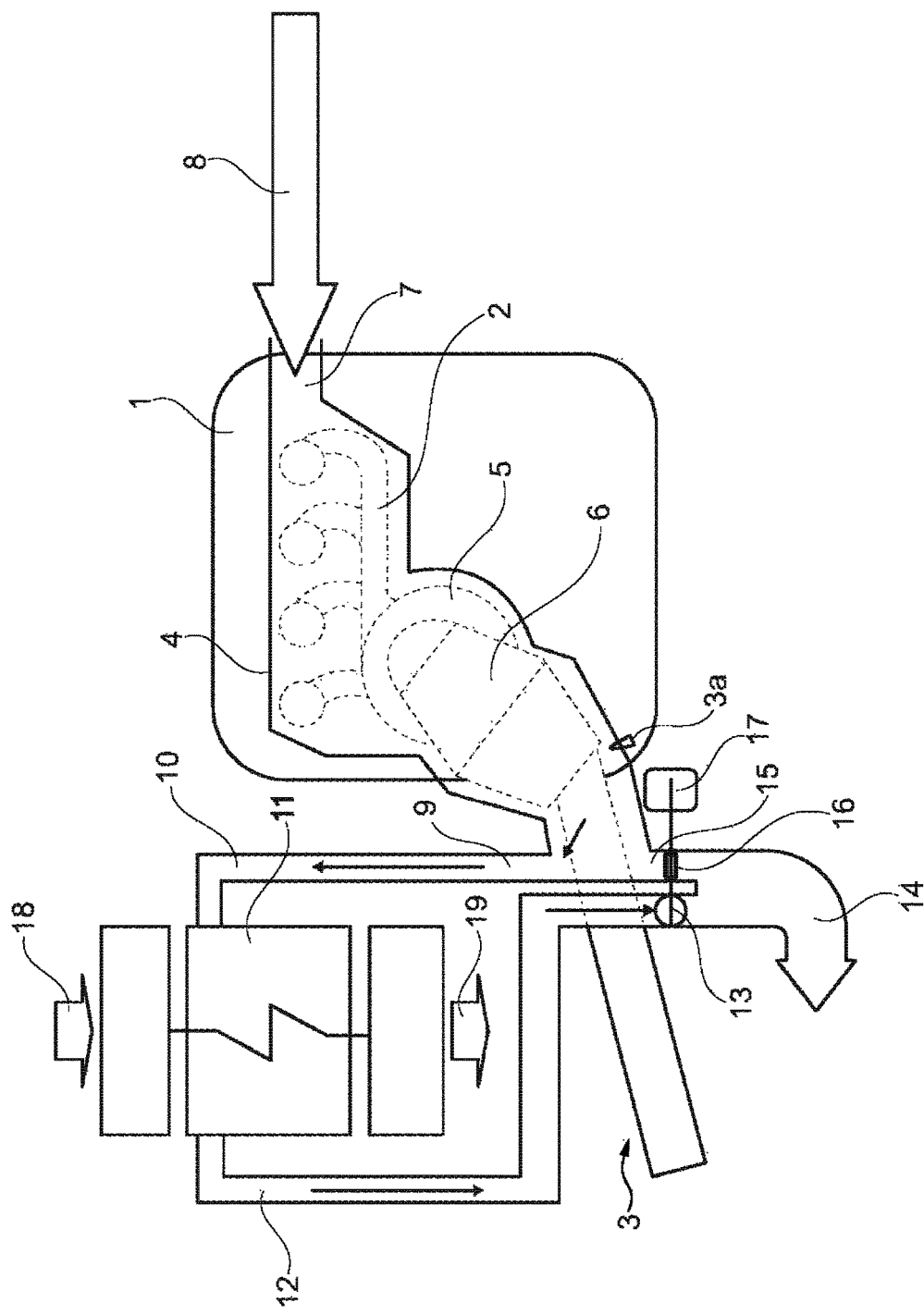
FIG. 1 shows the basic principle of the invention in a schematic illustration in accordance with an embodiment of the present invention.

FIG. 1 shows an internal combustion engine 1 of a vehicle (not illustrated specifically here). An exhaust manifold 2 via which exhaust gas coming from the individual cylinders of the internal combustion engine 1 is introduced into an exhaust system 3 is flange-mounted onto the internal combustion engine 1.

In the embodiment shown in FIG. 1, the entire exhaust manifold 2 and an engine-side portion 3a of the exhaust system 3 are surrounded or enclosed, i.e., encapsulated, by a waste-heat collecting housing 4. An exhaust gas turbocharger 5 and an exhaust gas catalytic converter 6 are arranged in the engine-side portion 3a of the exhaust system 3.

During the operation of the internal combustion engine, the exhaust manifold 2 and the exhaust gas turbocharger 5 and the catalytic converter 6 reach temperatures of several hundred degrees Celsius. As a result, the air contained in the waste-heat collecting housing 4 is greatly heated.

The waste-heat collecting housing 4 has an air inlet 7 via which air can flow out of an engine compartment of the vehicle into the waste-heat collecting housing 4, which is indicated by an arrow 8.

The waste-heat collecting housing 4 furthermore has a first air outlet 9. Air heated in the waste-heat collecting housing 4 can flow via the first air outlet 9 and an air duct 10 through a heat accumulator 11 or a heat exchanger (not illustrated) which is thermally coupled to the heat accumulator 11. Heat from the air heated in the waste-heat collecting housing 4 can thereby be dispensed to the heat accumulator 11 or stored in the heat accumulator 11. In this manner, cooled air is removed via an exhaust air duct 12 and an exhaust air flap 13 to the environment, which is symbolized by an arrow 14.

The waste-heat collecting housing 4 furthermore has a second air outlet 15 and an exhaust air flap 16 which interacts therewith and is closed in the position shown in FIG. 1. In the position shown in FIG. 1, all of the hot air flow flowing out of the waste-heat collecting housing 4 is therefore conducted via the heat accumulator 11 into the environment, wherein heat is stored in the heat accumulator 11.

When the heat accumulator 11 is completely or substantially completely "charged", the exhaust air ducts 13, 14 can be pivoted by means of an actuator 17. The actuator 17 can be, for example, an electric motor. By pivoting of the exhaust air flaps 13, 16, the exhaust air duct 12 can be closed and the second air output 15 opened. In this case, all of the air heated in the waste-heat collecting housing 4 would therefore be removed directly via the second air outlet 15 into the environment.

Via a heat exchanger (not illustrated specifically here), fresh air 18 from the environment can be heated by the heat stored in the heat accumulator 11. The air 19 heated by the heat accumulator 11 can then be blown into a passenger compartment (not illustrated specifically here) of the vehicle. In addition thereto, a further air/air heat exchanger could be provided by which heat from the air heated in the waste-heat collecting housing 4 can be directly transferred to the air to be blown into a passenger compartment.

Figure 2:
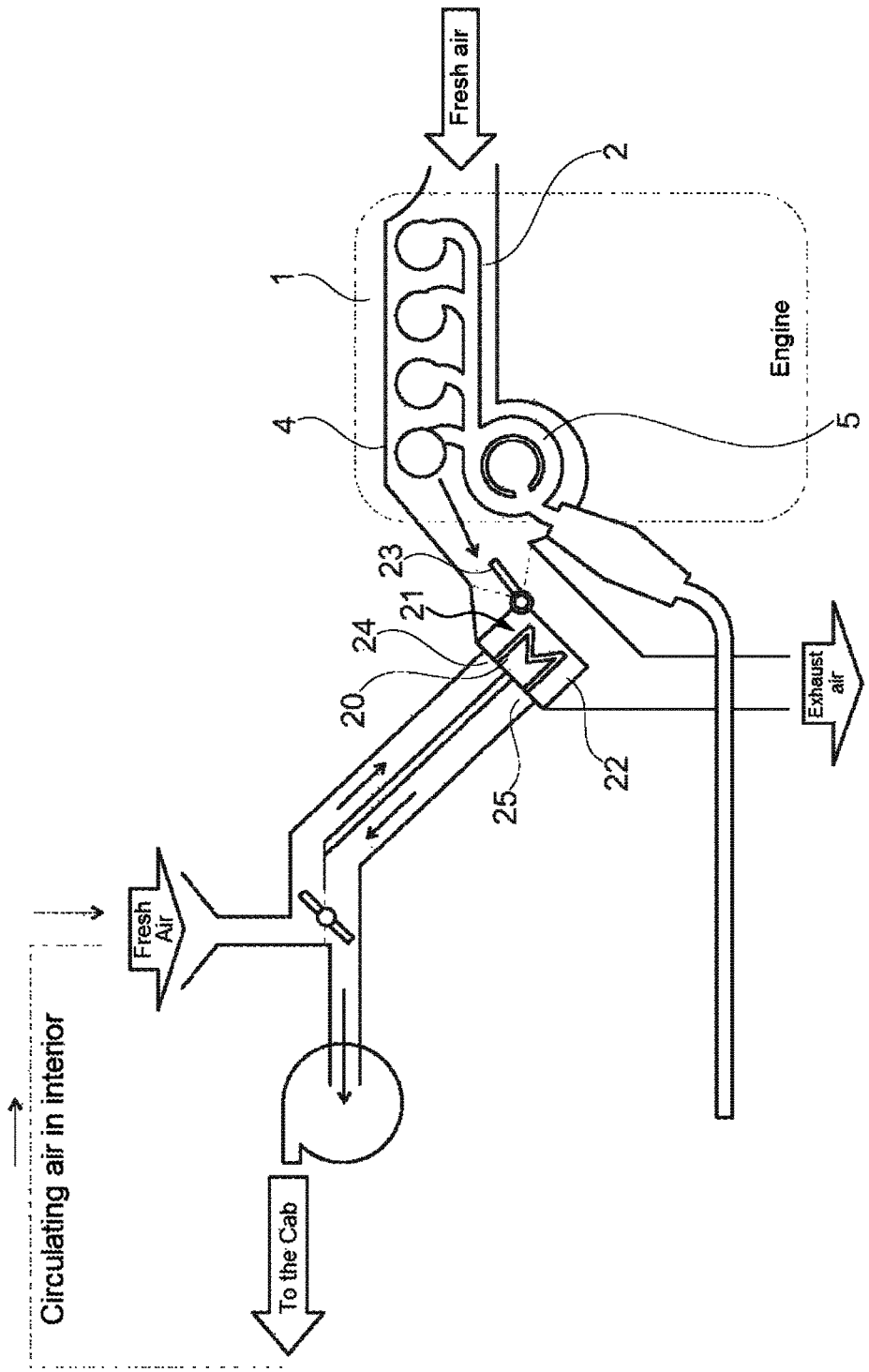
FIG. 2 shows an exemplary embodiment according to the invention with an exhaust gas/air heat exchanger device having a heat accumulator.
Figure 3:
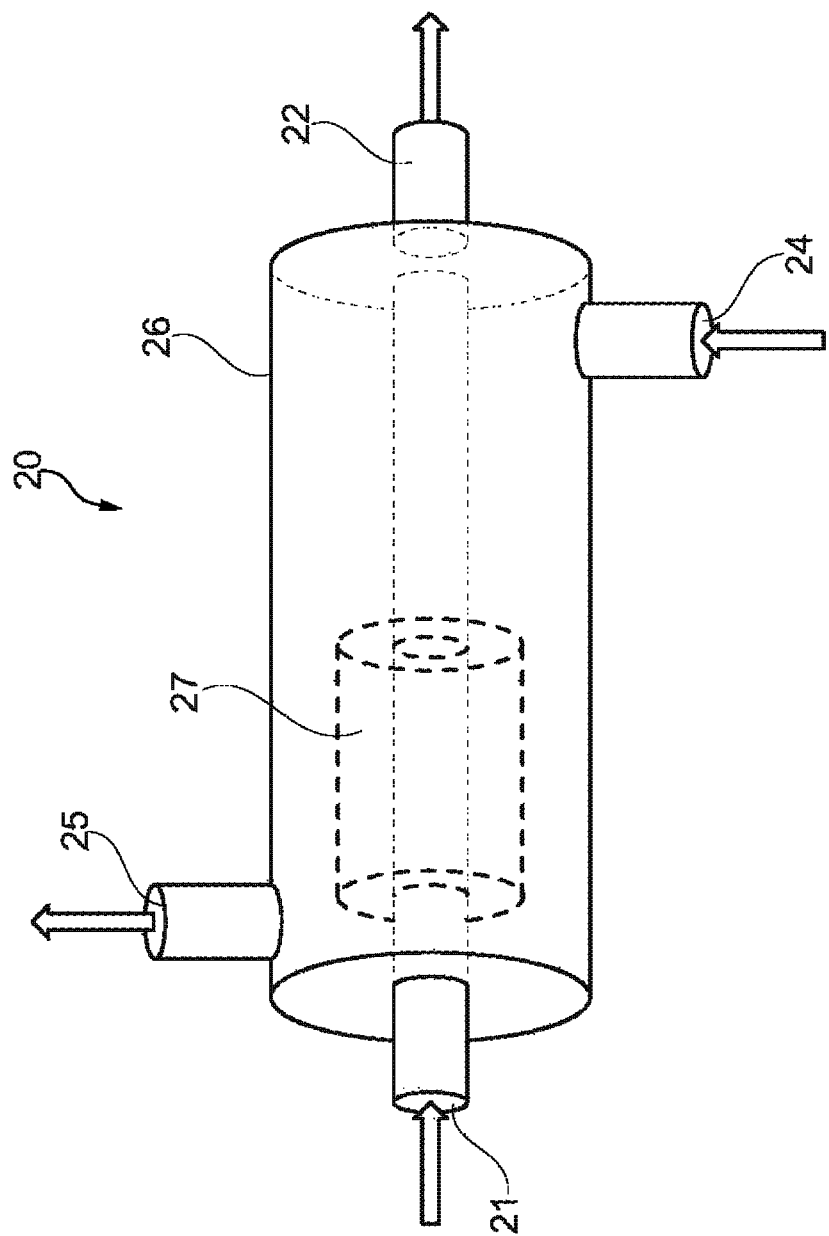
FIG. 3 shows details of the exhaust gas/air heat exchanger device having a heat accumulator.

In the case of the exemplary embodiment shown in FIG. 2, an exhaust gas/air heat exchanger device 20, which is explained in more detail below in conjunction with FIG. 3, is arranged in the waste-heat collecting housing 4. The exhaust gas/air heat exchanger device 20 has an input 21 for hot exhaust gas coming from the exhaust manifold 2 and an output 22 for cold exhaust gas.

Furthermore, an electrically activatable valve device or flap 23 is provided. Depending on the position of the flap 23, hot exhaust gas coming from the exhaust manifold 2 is conducted through or past the exhaust gas/air heat exchanger device 20. In the position of the flap 23 that is shown in FIG. 2, some of the hot exhaust gas coming from the exhaust manifold 2 flows through the exhaust gas/air heat exchanger device 20, and a second partial volumetric flow flows past the exhaust gas/air heat exchanger device 20.

The exhaust gas/air heat exchanger device 20 furthermore has an input 24 for passenger compartment air to be heated, and an output 25 for heated passenger compartment air.

FIG. 3 shows details of the exhaust gas/air heat exchanger device 20. The exhaust gas/air heat exchanger device 20 has a housing 26 with the input 21 for hot exhaust gas, the output 22 for cooled exhaust gas, the input 24 for passenger compartment air to be heated and the output 25 for heated passenger compartment air. A heat accumulator 27 is arranged in the interior of the housing 26 of the exhaust gas/air heat exchanger device 20. The heat accumulator 27 may be in particular a "latent heat accumulator" which is filled with a phase change medium. Heat which has been absorbed by the hot exhaust gas flowing in via the input 21 can be stored in the heat accumulator 27 for a prolonged period, i.e. for several hours or even several days.

A flow duct connecting the input 24 to the output 25 can be guided through the heat accumulator 27, which permits a transfer of heat from the heat accumulator medium of the heat accumulator 27 to the passenger compartment air to be heated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an internal combustion engine;
   an exhaust manifold configured to conduct exhaust gas from the internal combustion engine into an engine-side portion of an exhaust system;
   a waste-heat collecting housing;
   a heat accumulator,
   wherein
      the waste-heat collecting housing is arranged to at least partially surround at least one of the exhaust manifold and the engine-side portion of the exhaust system, such that air in the waste-heat collecting housing is heatable by waste heat from the at least one of the exhaust manifold and the engine-side portion of the exhaust system,
      the waste-heat collecting housing has an air inlet configured to receive the air to be heated by the waste heat into the waste-heat collecting housing and a first air outlet configured to conduct the air heated by the waste heat from the waste-heat collecting housing,
      the first air outlet is connected via an air duct to the heat accumulator, and
      the heat accumulator is configured to receive heat from the air heated by the waste heat.

2. The vehicle as claimed in claim 1, wherein
   the waste-heat collecting housing is at least partially composed of a metal sheet.

3. The vehicle as claimed in claim 1, wherein
   at least one catalytic converter of the exhaust system is arranged at least partially within the exhaust gas collecting housing.

4. The vehicle as claimed in claim 1, wherein
   at least one turbine-side region of an exhaust gas turbocharger is arranged within the waste-heat collecting housing.

5. The vehicle as claimed in claim 1, further comprising:
   an exhaust gas/air heat exchanger having a heat accumulator is arranged in the waste-heat collecting housing,
   wherein the exhaust gas/air heat exchanger has an input for hot exhaust gas, an output for cooled exhaust gas, an input receiving passenger compartment air to be heated, and an output release of heated passenger compartment air.

6. The vehicle as claimed in claim 1, wherein
   the waste-heat collecting housing has a second air outlet configured to bypass the first air outlet release and release the air heated in the waste-heat collecting housing to the environment.

7. The method as claimed in claim 6, further comprising:
   a fan arranged to produce an air flow in the waste-heat collecting housing toward at least one of the first air outlet and the second air outlet.

8. The vehicle as claimed in claim 7, wherein
   the air heated in the waste-heat collecting housing that has transferred heat to the heat accumulator is removable via an exhaust air duct to the environment.

9. The vehicle as claimed in claim 8, wherein
   the heat accumulator includes a phase change medium.

10. The vehicle as claimed in claim 9, further comprising:
    a first heat exchanger arranged to transfer the heat received by the heat accumulator to air within a passenger compartment of the vehicle.

11. The vehicle as claimed in claim 10, further comprising:
    a second heat exchanger configured to transfer from the air heated in the waste-heat collecting housing to the air in the passenger compartment of the vehicle while the heat accumulator is bypassed.

12. The vehicle as claimed in claim 11, wherein
    the first heat exchanger and the heat accumulator are arranged in a common housing.

13. The vehicle as claimed in claim 12, further comprising:
    a flap arranged to be controlled by a flap actuator,
    wherein the flap is controllable to be positioned such that all of the air from the waste-heat collecting housing is conducted via the first air outlet and the heat accumulator to the environment, all of the air from the waste-heat collecting housing bypasses the first air outlet and the heat accumulator and is conducted to the environment, or a first partial volumetric flow of the air from the waste-heat collecting housing is conducted via the first air outlet and the heat accumulator to the environment, and a second partial volumetric flow of the air from the waste-heat collecting housing bypasses the first air outlet and the heat accumulator and is conducted to the environment.

14. The vehicle as claimed in claim 13, wherein the actuator system has an electric actuator.

15. The vehicle as claimed in claim 13, wherein the flap has an unactuated basic position in which the all of the air from the waste-heat collecting housing bypasses the first air outlet and the heat accumulator and is conducted to the environment.

16. A method for recovery of heat from an internal combustion engine, comprising the acts of:

receiving air into a waste-heat collecting housing surrounding at least part of at least one of an exhaust manifold and an engine-side portion of an exhaust system of the internal combustion engine;

heating the air received in the waste-heat collecting housing by waste heat released from the at least one of an exhaust manifold and an engine-side portion of an exhaust system of the internal combustion engine; and transferring heat from the heated air to a heat accumulator.

* * * * *